Sept. 11, 1945.  C. L. EKSERGIAN  2,384,459
TRUCK AND BRAKE ORGANIZATION
Filed Aug. 8, 1941  2 Sheets-Sheet 1
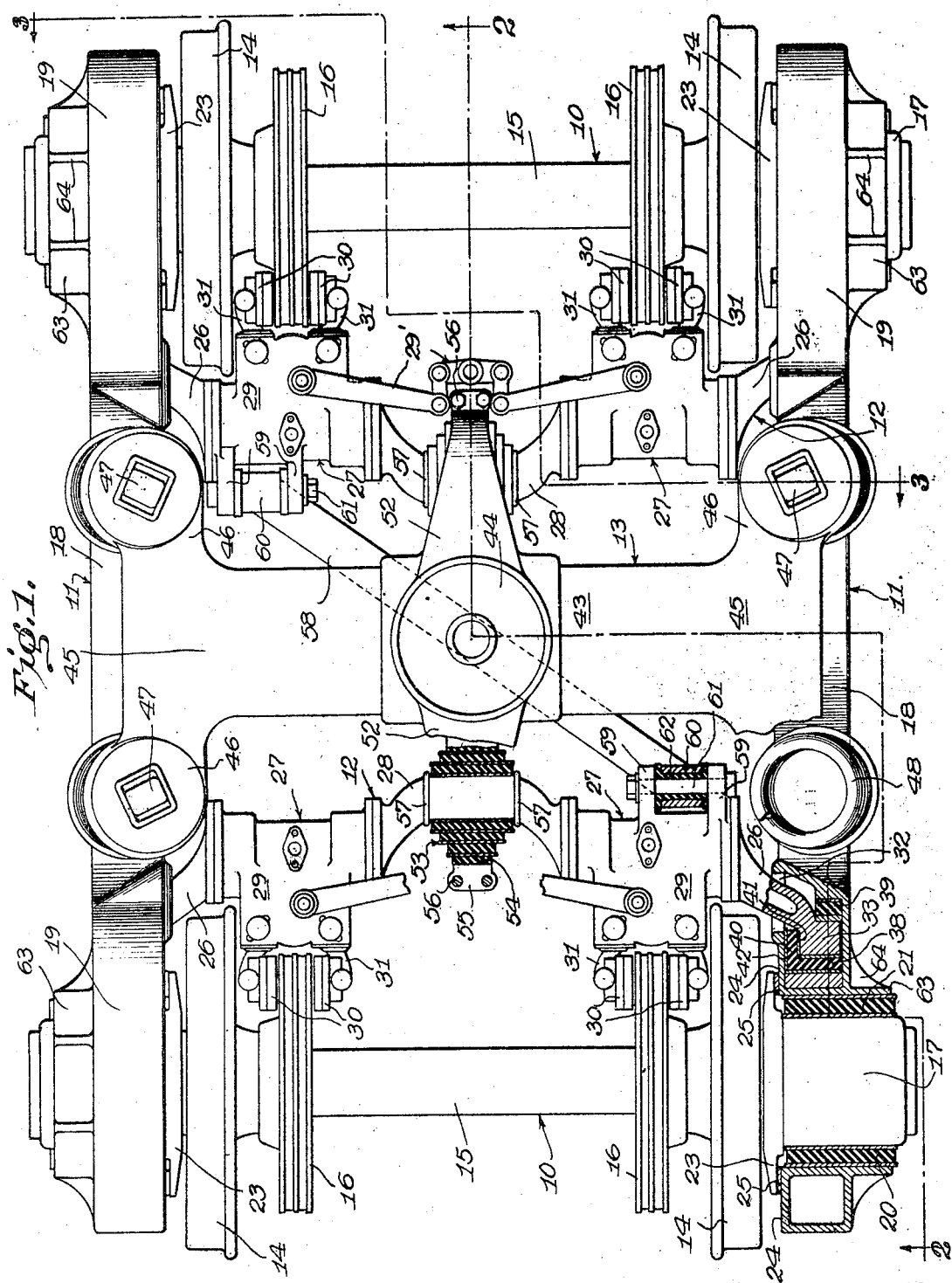
INVENTOR
Carolus L. Eksergian
BY John P. Bixby
ATTORNEY Sept. 11, 1945.  C. L. EKSERGIAN  2,384,459
TRUCK AND BRAKE ORGANIZATION
Filed Aug. 8, 1941  2 Sheets-Sheet 2
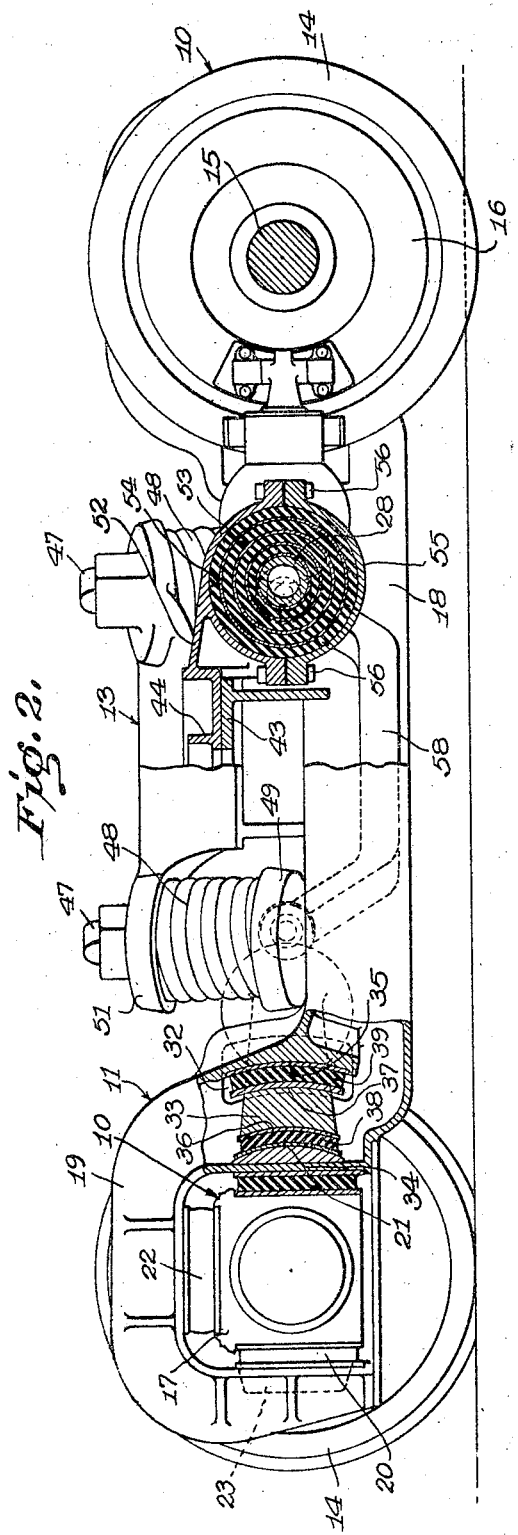
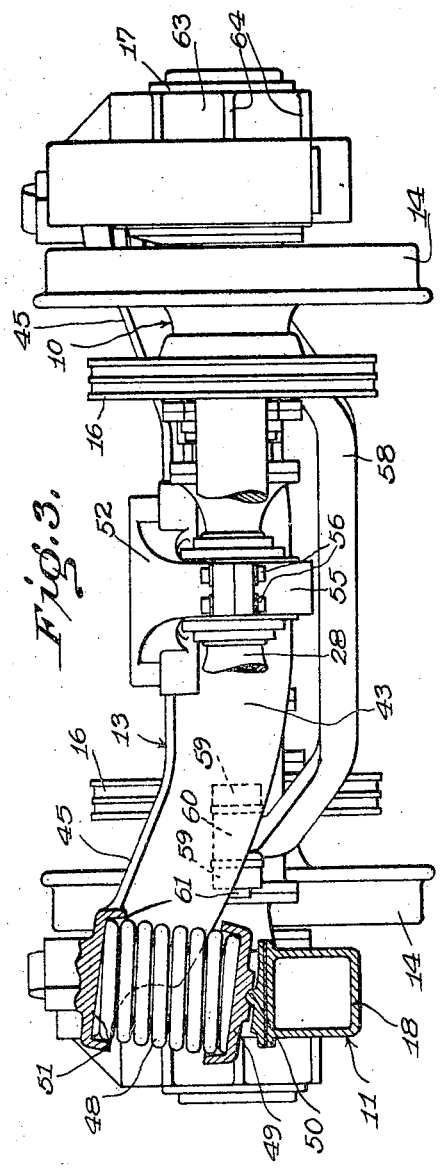
INVENTOR
Carolus L. Eksergian
BY John P. Tarbox
ATTORNEY Patented Sept. 11, 1945

2,384,459

UNITED STATES PATENT OFFICE 2,384,459

TRUCK AND BRAKE ORGANIZATION

Carolus L. Eksergian, Detroit, Mich., assignor to Budd Wheel Company, Philadelphia, Pa., a corporation of Pennsylvania Application August 8, 1941, Serial No. 405,903

10 Claims. (Cl. 105—182)

The invention relates to a railway truck and brake organization and more particularly to such an organization adapted for passenger as well as freight car trucks.

Such truck and brake organizations have heretofore been relatively heavy, complicated, and inflexible due to the manner in which the parts of the truck and the brake support were organized.

It is among the objects of my invention to provide a truck and brake organization of this class which is simple, light in weight, highly flexible, and quiet in operation, all without sacrifice of necessary strength and longevity.

These objects are attained in large part by so organizing the parts of the truck and brake that a number of the parts entering into the organization perform several functions, and by utilizing a single pair of side frame members to join the axles of the truck longitudinally and to take the place of the separate truck frame supported on separate equalizer bars. Another feature through which the objects are attained is in the provision of transverse members to take the place of the usual separate transoms and separate end transverse members, and in combining in these members brake cylinder units forming stress-carrying structural parts thereof. Flexibility to permit the truck to readily adjust itself to irregularities in the track is attained by making the joints between the side frame members and the wheel and axle assemblies and the transverse members flexible, and these joints are preferably cushioned with rubber to insure sufficient yield in the joints to prevent strain on the parts and to provide quiet operation.

The transverse frame members, which, in addition to tying together the side frames, carry the braking torque load, are at their central portions tied to the bolster, which is in turn spring-supported by the side frames at widely spaced points longitudinally to resist turning moment. This central tie-in to the bolster is through a flexible joint, which allows the slight transverse movement of the bolster desirable for smooth riding, and also cushions the relative vertical movements of the bolster and transverse members.

Due to the flexible connection of the transverse members to the side frames, the parallelogram formed by the side frames and wheel and axle assemblies may have a tendency to distort in the plane of the axles, which would bring about a condition in which the axis of the axles was not normal to the tracks. Such tendency is obviously undesirable and is positively prevented by this invention by either transversely lengthening the bearings between the axles and side frames or by diagonally interbracing the side frames or both.

Other objects and advantages and the manner in which they are attained will become clear from the following detailed description when read in connection with the drawings forming a part hereof.

In the drawings, which are more or less diagrammatic,

Fig. 1 is a plan view of a truck and brake organization according to the invention, with parts broken away and shown in section;

Fig. 2 is a vertical longitudinal part sectional and part side elevational view taken substantially along the broken line 2—2 of Fig. 1; and Fig. 3 is a vertical transverse part sectional and part elevational view taken substantially along the broken line 3—3 of Fig. 1.

In the form of the invention selected for illustration, the wheel and axle assemblies are each indicated generally by 10, the longitudinal side frames interconnecting the wheel and axle assemblies at the opposite sides of the truck by 11, the spaced transverse members interconnecting the side frames by 12, and the bolster by 13. It will be seen that these relatively few parts constitute the main structural elements of the novel organization.

Each wheel and axle assembly may comprise the wheels 14 arranged adjacent the ends of the axle 15, and with each wheel is associated, on its inner side, a brake member or ring 16 secured to rotate with the wheel, and on its outer side, surrounding the projecting end of the axle, a bearing box 17. While a rotary axle and bearing boxes therefor are shown, it will be understood that the axle may be of the non-rotary type with the wheels rotating on bearings on the axle.

In either case, a generally rectangular axle end, whether rigid with the axle or, as shown, forming a bearing box in which the axle rotates, is provided for coaction with the side frames 11.

Each side frame 11 is shown as comprising a box section beam having a depressed central horizontal portion 18 merging at its ends in the upwardly offset pedestal portions 19. Each pedestal portion is formed with a downwardly opening recess which receives the adjacent bearing box 17. The bearing box is slightly spaced from the sides and top of the recess, and in the space between the sides and top of the bearing box and the sides and top of the recess are inserted cushioning units, 20, 21 and 22. Each such unit may consist of a slab of rubber and metal plates vulcanized to its faces. When the parts are assembled, the rubber may be in a pre-compressed state. The side slabs are preferably thinner than the top slab to resist angular movement of the axle in its plane with respect to the side frame. The top cushioning unit serves to carry the vertical load on the frame and cushions vertical movement of the axle.

From the foregoing, it will be seen that the connection of the axles to the side frames is sufficiently flexible to permit the relative tilting of the axles due to track irregularities without imposing severe strains on the parts. Vibrations caused by the engagement of the wheels with the rails are not allowed to reach the truck frame proper.

To transmit lateral thrusts from the wheel and axle assemblies to the side frames or vice versa, each axle end has associated with it adjacent the wheel an outwardly facing shoulder 23 which coacts with the inner face 24 of the adjacent pedestal portion 19. Wear plates, as 25, may be applied to this face.

Each transverse member 12 interconnecting the side frames 10 adjacent a wheel and axle assembly may comprise a hollow-section yoke including inclined end portions 26, brake cylinder units 27 and a central portion 28, all rigidly secured together to form a strong beam structure. Each brake cylinder unit may comprise a T-form casing 29 carrying non-rotary brake elements 30 in position to cooperate with the opposed braking faces of the associated rotary brake element 16 and actuating means for the non-rotary brake elements comprising levers 31 pivoted in the casing 29 and actuated by pistons (not shown) movable in the transverse cylinder portion of the casing or by manually operable lever and link mechanism 29', all as clearly disclosed in my copending application Serial No. 399,779, filed June 26, 1941.

The extreme ends of the transverse members extend through openings 32 in the hollow side frame members and are provided with arcuate end portions 33 (see Fig. 2) formed on an arc substantially concentric with the axis of the adjacent axle, and flexibly secured to the side frames. On opposite sides of the arcuate end portion 33 in longitudinal direction, similar arcuate faces 34 and 35 are provided on the side frame, and between these faces 34 and 35 and the opposed arcuate faces 36 and 37 of end portion 33 are interposed arcuate cushioning units 38 and 39. These units may each comprise a slab of rubber vulcanized to opposed metal strips. The arcuate cushioning unit 38 may be provided, as shown in Fig. 1, with a lateral extension 40 interposed between an inner flat face 41 of the arcuate end portion 33 of the transverse member 12 and the opposed face 42 on the side frame member.

Thus it will be seen that the transverse members 12 strongly interconnect the side frame members but with considerable flexibility in the joints to allow for the relative tilting of the axles and the vertical movement of the yoke-like brake-supporting members due to road shocks and/or braking torque, which latter will obviously be transmitted to these members. The braking torque load is transmitted through the central portion 28 in a manner to be pointed out hereinafter.

The depressed horizontal portions 18 of the side frame afford a convenient means for resiliently supporting the bolster 13 in a low-hung position. The bolster has a depressed central portion 43 carrying the center plate 44 to receive the center plate and king pin (not shown) of the car body to be supported thereby. At its ends the bolster is outwardly and upwardly inclined as at 45 and terminates at each end in fore and aft extensions 46 which give the bolster in plan an I-shaped appearance. On each of the tops of these extensions 46 may be provided the roller side bearings 47, with the axis of the rollers generally radial to the king pin, for coaction with corresponding side bearings on the body. These extensions 46 form a wide-based four-point support of the bolster from the side frames, and by reason of the upward inclination of the ends of the bolster and the depressed location of the tops of the side frames in this central region, ample space is provided for the insertion of low-rate springs, as coil springs 48, between the bolster and side frames, thus insuring easy riding qualities, and at the same time maintaining a very low center of gravity.

Each of the four springs 48 is similarly arranged except that the springs on opposite sides of the truck are oppositely inwardly inclined, whereby the bolster is automatically centered. As shown in Fig. 3, the lower end of a spring is seated in a cup seat 49 which seats on the reinforced top of the side frame through a longitudinally extending rocker bearing 50 which permits the spring and cup to swing about this bearing in the transverse movements of the bolster desirable for easy riding. A similar cup and bearing may be provided between the top of the spring and the bolster extension 46, but in the diagrammatic showing this has been merely indicated as a cup bearing 51 on the bolster extension itself in which the upper end of the spring is shown seated.

Each of the transverse members 12 is centrally connected to the bolster by a flexible connection which has relatively minor resistance to the desired transverse movement of the bolster and cushions such movement, and relatively major resistance to the relative vertical movements of the transverse member and bolster due to road shocks or braking torque.

To this end, the bolster is provided with central fore and aft extensions 52, each embracing the central portion 28 of the adjacent transverse member 12. To secure the proper degree of flexibility, an annular space of substantial radial extent is provided between each of the parts 52 and 28, and a flexible unit 53, consisting preferably of a plurality of rubber annuli spaced by metallic rings and the annuli and rings being of decreasing transverse width radially outwardly, is inserted and compressed between the central portion 28 of the transverse member and a cylindrical transverse opening 54 in the adjacent extension 52. For convenience of assembly, the lower semicircular part of this opening is made as a separate piece 55 which is clamped by bolts, as 56, to the main part of the extension 52 carrying the upper semi-cylindrical part of the opening. Any suitable means may be provided to prevent the transverse shifting of the flexible unit, such as shoulders 57 on the central portion 28 of the transverse member 12 and the frictional or other more positive engagement of the walls of the cylindrical opening 54 with the outer peripheral portion of said unit. The rubber and metal rings of the unit are, of course, bonded together, as by vulcanization.

This arrangement comprises a minor resistance to relative lateral movement of the bolster and transverse member because of the decreasing width of the flexible unit radially outwardly and because the rubber acts in shear and is of sufficient radial thickness to yield more readily in shear. In relative vertical or horizontal (lengthwise of the truck) movement between the parts, the rubber acts in compression and tension and imposes a greater resistance to such movement.

Since the connections between the wheel and axle assemblies and the cross members are flexible, as described, the rectangle (as seen in plan) formed by the side frames and the wheel and axle assemblies may become distorted, in the plane of the axles, into a rhomboid so as to cause the wheel and axle assemblies to assume other than the desired right angular relation to the track rails. Means are provided in the novel organization to oppose such undesired distortion. Such means may comprise several features acting in conjunction or independently of each other to correct this condition.

One way of correcting this condition is to provide a diagonal brace extending between the opposite side frames of the truck. Such diagonal brace is already present in the structure so far described in one half of one transverse member 12 and its connection through the bolster 13 to the opposite half of the other transverse member, but this includes the flexible connecting units 53 and may for this reason, in some cases, be insufficient diagonal bracing to adequately correct this undesired condition. In such cases, a separate diagonal bracing member 58 may be provided, and this member may be connected to the diagonally opposed cylinder units 27 of the transverse members 12. In the form shown, two diagonally opposed cylinder units are each provided with spaced ears 59, between which is disposed a cylindrical eye 60 on the end of the bracing member 58, the spaced ears 59 and the interposed eye 60 being pivotally connected by a bolt 61 extending through openings in the ears and the eye. To provide for additional flexibility and eliminate noise, the eye 60 is preferably spaced from the bolt 61 and the ears 59 by a flanged sleeve 62 of rubber or the like.

It will be seen that this bracing member 58, together with the inclined end portions 26 of the transverse members 12, forms a substantially continuous rectilinear (when viewed in plan) diagonal brace extending from side frame to side frame and interconnecting them adjacent the wheel and axle assemblies at the opposite ends of the truck.

Another way of correcting this undesired distortion may be provided, as shown, by transversely widening the interengagement between the axle boxes and pedestals. The wider this interengagement, the less the undesired distortion possible. In the drawings, the side frames 12 are shown provided with lateral bearing extensions 63 braced by webs 64 to the bodies of the frames, and the axle boxes are similarly transversely widened.

It will be understood that any one of these expedients alone may, under certain conditions, be sufficient to correct this undesired distortion, but that, under other conditions, it may be desired to combine several of them in the same structure to more effectively guard against this condition.

From the foregoing detailed description, the operation of the novel truck and brake organization is believed clear, and further description of its operation is believed unnecessary. It will be understood that changes and modifications may be made from the specific embodiment described, and such changes and modifications as would readily occur to those skilled in this art are intended to be included within the scope of the claims appended hereto.

What is claimed is:

1. In a truck and brake organization, the combination of a pair of spaced wheel and axle assemblies each including bearing extensions outside the wheels thereof, side frame members having bearings at their ends embracing the axle extensions, respectively, of said axles at the opposite ends thereof and interconnecting said axles longitudinally, spaced transverse members interconnecting said side frame members and each serving also as a brake support for supporting non-rotary brake elements and including as a structural part thereof a housing for a brake cylinder device for actuating said elements, a bolster yieldingly supported from said side frame members between said transverse members and flexibly connected to intermediate portions of said transverse members, the connections between the side frame members and the wheel and axle assemblies and the transverse members being flexible to permit the limited relative tilting of the wheel and axle assemblies due to track irregularities without imposing undue strain on the parts.

2. A truck and brake organization according to claim 1, in which means are provided to prevent objectionable distortion in the plane of the axles of the normally rectangular relation of the wheel and axle assemblies and side frames.

3. In a truck and brake assembly, the combination of a pair of longitudinally spaced wheel and axle assemblies each including axle extensions outside the wheels thereof, a pair of side frame members forming the sole longitudinal connection between the opposite ends of said assemblies and each having bearings at its ends embracing, respectively, the adjacent axle extensions of said assemblies, a pair of spaced transverse members including brake cylinder housings as structural parts thereof interconnecting said side frame members, the connections between said side frame and said transverse members being flexible to permit some relative tilting of the axles of said assemblies without imposing undue strain on the parts, the rectangle formed by said side frame members and said assemblies being braced against distortion in the plane of the axles by diagonally extending bracing means connecting opposite ends of the respective side frame members and including portions of said transverse members.

4. In a truck and brake assembly, the combination of a pair of longitudinally spaced wheel and axle assemblies each including axle extensions outside the wheels thereof, a pair of side frame members forming the sole longitudinal connection between the opposite ends of said assemblies and each having bearings at its ends embracing, respectively, the adjacent axle extensions of said assemblies, a pair of spaced transverse members including brake cylinder housings as structural parts thereof interconnecting said side frame members, the connections between said side frame members and said transverse members being flexible to permit some relative tilting of the axles of said assemblies without imposing undue strain on the parts, the rectangle formed by said side frame members and said assemblies being braced against distortion in the plane of the axles by means comprising a diagonally extending brace between a brake cylinder housing on one transverse member and a brake cylinder housing on the other, and flexible connections joining said brace and the respective housings.

5. In a truck and brake assembly, the combination of a pair of longitudinally spaced wheel and axle assemblies, each including axle extensions outside the wheels thereof, a pair of side frame members forming the sole longitudinal connection between the opposite ends of the wheel and axle assemblies, and each having bearings at their ends embracing, respectively, the adjacent axle extensions of said assemblies, a pair of spaced transverse members, each including spaced brake cylinder housings forming structural parts thereof, interconnecting the side frame members one adjacent each wheel and axle assembly, the connections between said side frame members and the wheel and axle assemblies and the transverse members being flexible to permit slight weaving of the truck due to track irregularities without imposing undue strain on the parts, a bolster resiliently supported from the side frame members between said transverse members, and means flexibly connecting the opposite sides of the bolster to said transverse members to permit limited transverse movement of the bolster.

6. A truck and brake assembly according to claim 5, in which the flexible connection comprises a rubber annulus surrounding the central portion of the associated transverse member and surrounded by an extension of the bolster.

7. A truck and brack assembly according to claim 5, in which the flexible connection comprises a series of concentric rubber annuli spaced by metallic annuli, the rubber being bonded to the metallic annuli, the inner metal annulus being secured to the adjacent transverse member and the outer annulus of the series being embraced by an extension of the bolster.

8. In a truck and brake organization, a pair of spaced wheel and axle assemblies each including axle extensions outside the wheels thereof, a pair of side frame members each including bearings receiving the adjacent axle extensions, said side frame members comprising the sole means for longitudinally spacing the opposite ends of said assemblies, and a pair of spaced transverse members interconnecting said side frame members, said transverse members each comprising support means for non-rotary brake elements and operating means therefor arranged for cooperation with an associated rotary brake element on the adjacent assembly, the connections between said side frame members and said assemblies and transverse members being flexible so as to permit limited relative tilting of the axles of said assemblies without imposing undue strain on the parts, and pivotal connections between said transverse members and said side frame members constraining the transverse members to swing substantially about the axis of the adjacent axle.

9. In a truck and brake organization, in combination a pair of spaced wheel and axle assemblies having axle extensions outside the wheels, a pair of side frames having bearings embracing said extensions on the opposite sides of the truck, respectively, and forming the sole means for spacing said wheel and axle assemblies, a pair of transverse members interconnecting said side frames, one adjacent each wheel and axle assembly, said transverse members constituting brake supports each comprising a brake cylinder housing as a structural part thereof, the connections between said side frames and said wheel and axle assemblies and transverse members being flexible to permit the limited relative tilting of the axles of said wheel and axle assemblies due to track irregularities without imposing undue strain on the parts, and a bolster resiliently supported by said side frames and transverse members to permit vertical and limited lateral movement thereof.

10. In combination, a truck including a wheel and axle assembly and side frame members supported thereby, and a brake supporting frame extending between said side frame members and supported on the truck laterally outside the respective wheels of said assembly, said support of the brake supporting frame at each side of the truck being through a segmental bearing disposed wholly at one side of, and in radially spaced and substantially concentric relation to, the axis of the axle of said assembly.

CAROLUS L. EKSERGIAN.